Sept. 13, 1966 E. LANGECKER 3,272,681
APPARATUS FOR APPLYING LABELS, PLATENS
OR THE LIKE ON HOLLOW BODIES
Original Filed April 12, 1961 2 Sheets-Sheet 1

INVENTOR
ERHARD LANGECKER
BY
ATTORNEY.

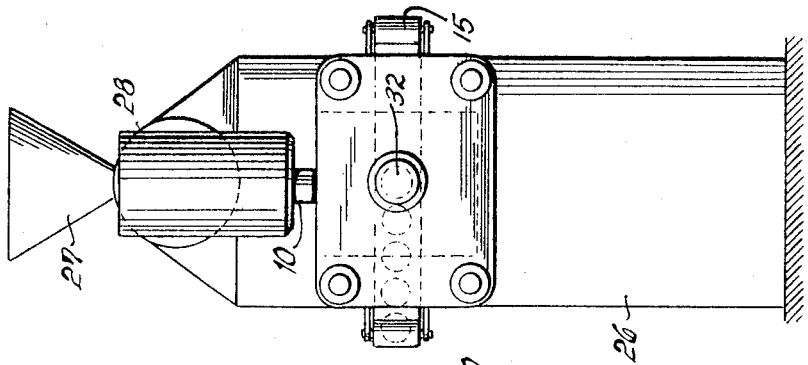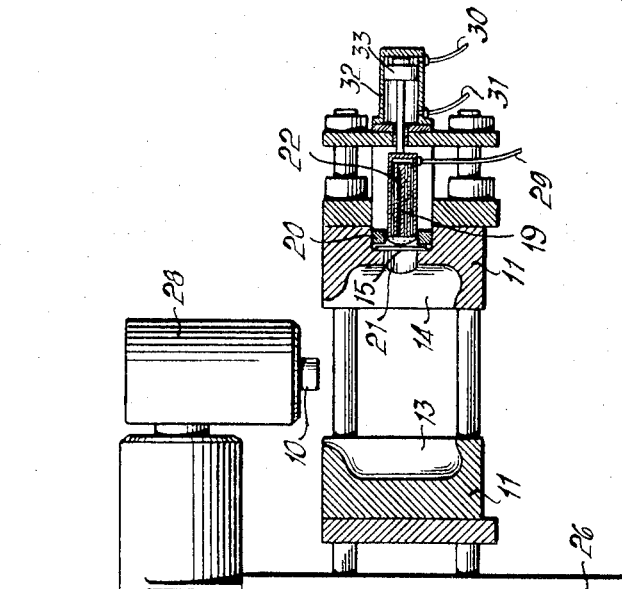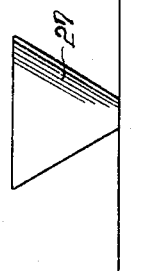

3,272,681
APPARATUS FOR APPLYING LABELS, PLATENS OR THE LIKE ON HOLLOW BODIES
Erhard Langecker, Meinerzhagen, Westphalia, Germany, assignor to Firma Gebruder Battenfeld, Meinerzhagen, Germany, a corporation of Germany
Original application Apr. 12, 1961, Ser. No. 102,581. Divided and this application Jan. 2, 1962, Ser. No. 163,809
Claims priority, application Germany, April 12, 1960, B 57,457
4 Claims. (Cl. 156—518)

The present invention relates to an apparatus for applying markings, as labels, platens or the like to hollow bodies in a blowing process.

This is a divisional application to the co-pending application Serial No. 102,581, filed April 12, 1961, now abandoned.

It is known to print on hollow bodies blown from hoses or bands after the blowing process. This printing is time-consuming, particularly on bulky parts and especially in case of a multi-color print due to the partly required pre-treatment of the blown hollow bodies, in order to adhere the color properly. Above all, for each configuration of the hollow bodies particular printing machines must be used.

It is, therefore, one object of the present invention to provide an apparatus for applying markings, as labels, platens or the like to hollow bodies in a blowing process, wherein the drawbacks of the known structures are avoided.

It is another object of the present invention to provide an apparatus for applying markings, as labels, platens or the like to hollow bodies in a blowing process, wherein one or multi-color printed, cold or pre-heated, thin walled leaves of the same or weldable or glueable material are inserted into hollow form halves or they are tensioned over the form halves, whereby a satisfactory connection is brought about during the blowing process. It is possible, if desired, to use, instead of the pure leaves of synthetic material, also paper which has a layer of weldable synthetic material or glueable material corresponding with the material to be blown up, which paper may be printed with one color or with multiple colors on the side opposite that carrying the layer and which can be pressed also in relief. In this case a satisfactory welding connection is achieved.

It is of advantage not to insert the leaf manually, and different possibilities are suitable for this purpose. There is one possibility to use a leaf, which is wider than the blown up body. In this case, in a manner conventional with the blowing of celluloid plates, during the closing of the form, a leaf corresponding in size to the form, is punched out by squeezing it off. The remaining margin can then be used for the further conveying of the leaf to the next process step.

A further possibility exists in an arrangement according to which a printed leaf band is pulled over the form crosswise or lengthwise to the hose and is squeezed off in the same manner as set forth above. The further transportation of the leaf is brought about by gripping means which grips the cut-off end of the leaf and is pulled over the form halves corresponding with a printing guide. The guides of the sheet should be suitably movable with the corresponding form half, in order not to interfere with the feeding of the raw material to be blown up, namely the hose or the band. The insertion of the paper having a layer of suitable material and which under circumstances is also printed, can take place in the same manner. It is, however, necessary to observe that the paper having a layer is properly connected during the blowing process with the blown up hose body, yet does not join the extension, which is possible in connection with leaves of thermoplastic material.

It is a further possibility to feed a paper of predetermined size having a layer by means of a particular feeding device into the hollow mold from the side of the clamping plate of the mold by a stamp which is equipped with vacuum nozzles for securing of the paper. The stamp forms then with the layer carrying paper one part of the mold.

The possibility exists thereby to use the feeding stamp, which is equipped with vacuum nozzles, simultaneously as a cutting stamp and to stamp out corresponding sections from a leaf band or a paper band having a layer of synthetic material or glueable material and to feed these sections into the blowing mold. In this case uneven and curved faces can be inserted upon application of expandible leaves, while in the case of paper only the possibility of deforming of the paper by vacuum exists.

With these and other objects in view which will become apparent in the following detailed description, the present invention will be clearly understood in connection with the accompanying drawings, in which:

FIG. 3 is an elevation of an apparatus for applying labels, platens or the like to a hollow body, shown partly in section; and FIG. 4 is an end view thereof.

Figure 1:
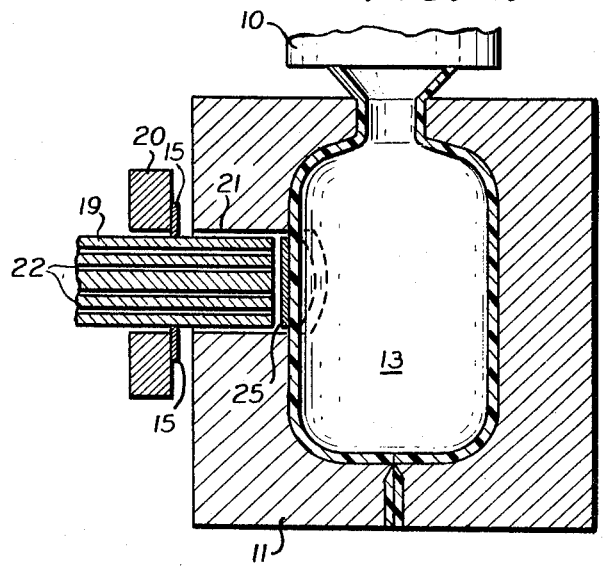
FIGURE 1 is an axial section of a blowing mold, the latter being shown in closed position.
Figure 2:
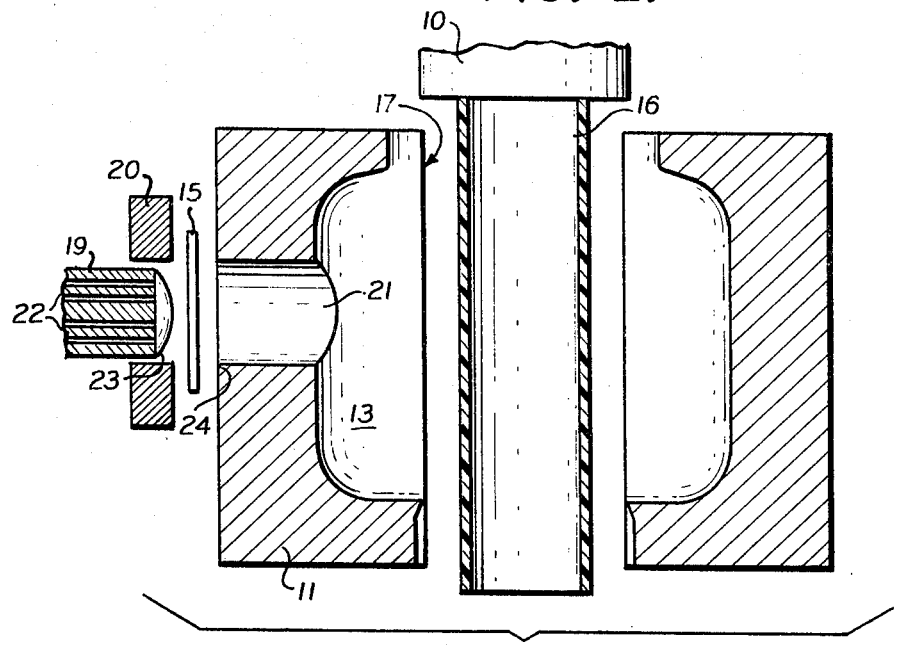
FIG. 2 is an axial section of a blowing mold shown in open position.

Referring now to the drawings, FIGS. 1 and 2 disclose the mold in two halves divided along a plane disposed at a right angle to the longitudinal axis of the mold in closed and open position of the latter, respectively. The mold halves 11 are equipped with a squeezing edge 17 and are disposed parallel to the axis of the hose 16, which is extruded by means of the nozzle 10. The mold half 11 is equipped with an opening 21, which has a cross-section exactly identical with that of a stamp 19 so that the edge 23 of the stamp 19 forms jointly with the edge 24 of the form half 11 a punching tool. Between the two cutting edges 23 and 24, the strip or the layer carrying paper 15 is inserted. During the closing movement, the stamp 19, which is equipped with vacuum nozzles 22, is moved onto the hollow chamber 13. By this arrangement, a sheet 25 (FIG. 1) is stamped out from the strip 15 and the layer carrying paper, respectively, by means of the cutting edges 23 and 24, which sheet 25 assumes, due to the concavely curved end face of the stamp 19, the form of the inner face of the wall of the bottle-shaped like member 13 and engages the stamp 19 by suction by means of the vacuum nozzles 22.

Upon completion of the closing process, the stamp 19 forms one part of the wall of the mold. Depending upon the length of movement of the stamp 19, the sheet of thermoplastic material or of a layer carrying paper can be disposed, deepened or elevated to or also flush relative to the inner wall face of the chamber 13, as shown in FIG. 1. Upon termination of the blowing step, the stamp 19 is returned to its original position, upon releasing the vacuum effect in the nozzles 22. During this step, the remaining portion of the strip 15 is taken off by means of a stripping ring 20 from the stamp 19, so that the strip or the layer carrying paper 15 can be moved past the stamp 19 into a new operative position.

The conveying device for the leaf 15 can be of a structure similar to that used in the sheet metal industry and in printing plants, respectively. It is also possible to insert already pre-stamped sheets instead of cutting them during the insertion step and to insert the sheets into the hollow body in the manner described above.

Referring now to FIGS. 3 and 4 of the drawings, the mold of a blowing machine for hollow bodies is shown in an elevational and an end view, respectively, according to which a filling funnel 27 is provided on a machine frame 26 for feeding the thermoplastic mass into the machine. An extruding device 28 of conventional nature as to its structure and function which produces the hose is disposed on an extension of the machine above the mold halves 11 and 12, the material being fed to the extruder 28 in known manner through the funnel 27. A vacuum-producing device (not shown) is in connection with a conduit 29, which in turn is operatively connected with the nozzles 22 in the stamp 19, while conduits 30 and 31, respectively, serve the purpose to feed and to remove air into and out of a cylinder 32, respectively, in which a piston 33 connected with the stamp 19 is reciprocating, in order to bring about the reciprocating movement of the stamp 19.

While I have disclosed one embodiment of the present invention, it is to be understood that this embodiment is given by example only and not in a limiting sense, the scope of the present invention being determined by the objects and the claims.

I claim:
1. An apparatus for applying markings to hollow bodies during the molding thereof, comprising
   a complete hollow mold comprising two mold halves and defining an opening through one wall thereof,
   means to supply an extruded hose into and received in said mold and disposed perpendicularly to the longitudinal axis of said opening,
   a stamp having an operative end face complementary to said opening, and forming part of the inner wall of said mold, said stamp reciprocating in said opening of said mold during the closed position of said two form halves,
   said stamp having at least one axially disposed channel adapted to be connected with a vacuum source, and
   means for reciprocating said stamp alternately into an inoperative position outside of said opening of said mold with said end face spaced apart from said mold and into an operative position inside said opening, for applying markings to a hollow body.
2. The apparatus, as set forth in claim 1, wherein said end face of said stamp has a cutting edge cooperating with the outer edge of said opening of said mold and adapted to stamp out portions of a strip of material fed between said mold opposite said opening and said end face of said stamp in said inoperative position.
3. The apparatus, as set forth in claim 1, which includes
   a stripping ring surrounding and cooperating with said stamp outside said mold.
4. The apparatus, as set forth in claim 1, wherein said operative end face of said stamp has a shape complementing the inner face of said mold at the inner end of said opening.

References Cited by the Examiner

UNITED STATES PATENTS

| | | | |
|---|---|---|---|
| 1,744,438 | 1/1930 | Benson | 156—287 |
| 2,632,202 | 3/1953 | Haines | 156—244 |
| 2,684,775 | 7/1954 | Von Hofe | 156—475 |
| 2,811,744 | 11/1957 | Baldanza | 156—238 |
| 2,922,192 | 1/1960 | Morin. | |
| 2,959,812 | 11/1960 | Allen. | |
| 3,021,559 | 2/1962 | Strong. | |
| 3,072,969 | 1/1963 | Dubois | 156—209 |
| 3,108,850 | 10/1963 | Brandt. | |
| 3,142,098 | 7/1964 | Wilkalis et al. | 156—244 |

EARL M. BERGERT, *Primary Examiner.*

H. F. EPSTEIN, *Assistant Examiner.*